United States Patent [19]

Kaliszewski

[11] Patent Number: 5,673,938
[45] Date of Patent: Oct. 7, 1997

[54] STEERING COLUMN QUICK-RELEASE MOUNTING

[75] Inventor: Thomas S. Kaliszewski, Troy, Mich.

[73] Assignee: Chrysler Corporation, Auburn Hills, Mich.

[21] Appl. No.: 645,372

[22] Filed: May 13, 1996

[51] Int. Cl.⁶ .................................................. B62D 1/19
[52] U.S. Cl. ........................... 280/777; 280/779; 74/492; 248/231.31; 248/900
[58] Field of Search .............................. 280/777, 779, 280/780; 74/492; 248/231.31, 900

[56] References Cited

U.S. PATENT DOCUMENTS

| | | | |
|---|---|---|---|
| 3,476,345 | 11/1969 | Ristau | 74/492 |
| 3,740,068 | 6/1973 | Arata | 280/777 |
| 4,000,876 | 1/1977 | Usui et al. | 280/777 |
| 4,452,096 | 6/1984 | Workman | 280/777 |
| 4,884,778 | 12/1989 | Yamamoto | 74/492 |
| 5,390,955 | 2/1995 | Kaliszewski et al. | 280/777 |

Primary Examiner—Brian L. Johnson
Assistant Examiner—Peter C. English
Attorney, Agent, or Firm—Edward A. Craig

[57] ABSTRACT

Apparatus for dampening vibration of a steering column which permits quick release and axial collapse of the steering column in a collision. Mounting brackets on the steering column have slide bars which fit in grooves in support brackets secured to the vehicle frame. Wedges fit in recesses between the slide bars and grooves to dampen vibration. The wedges release instantly when the steering column collapses in a frontal impact, allowing the collapse of the steering column without interference.

11 Claims, 3 Drawing Sheets

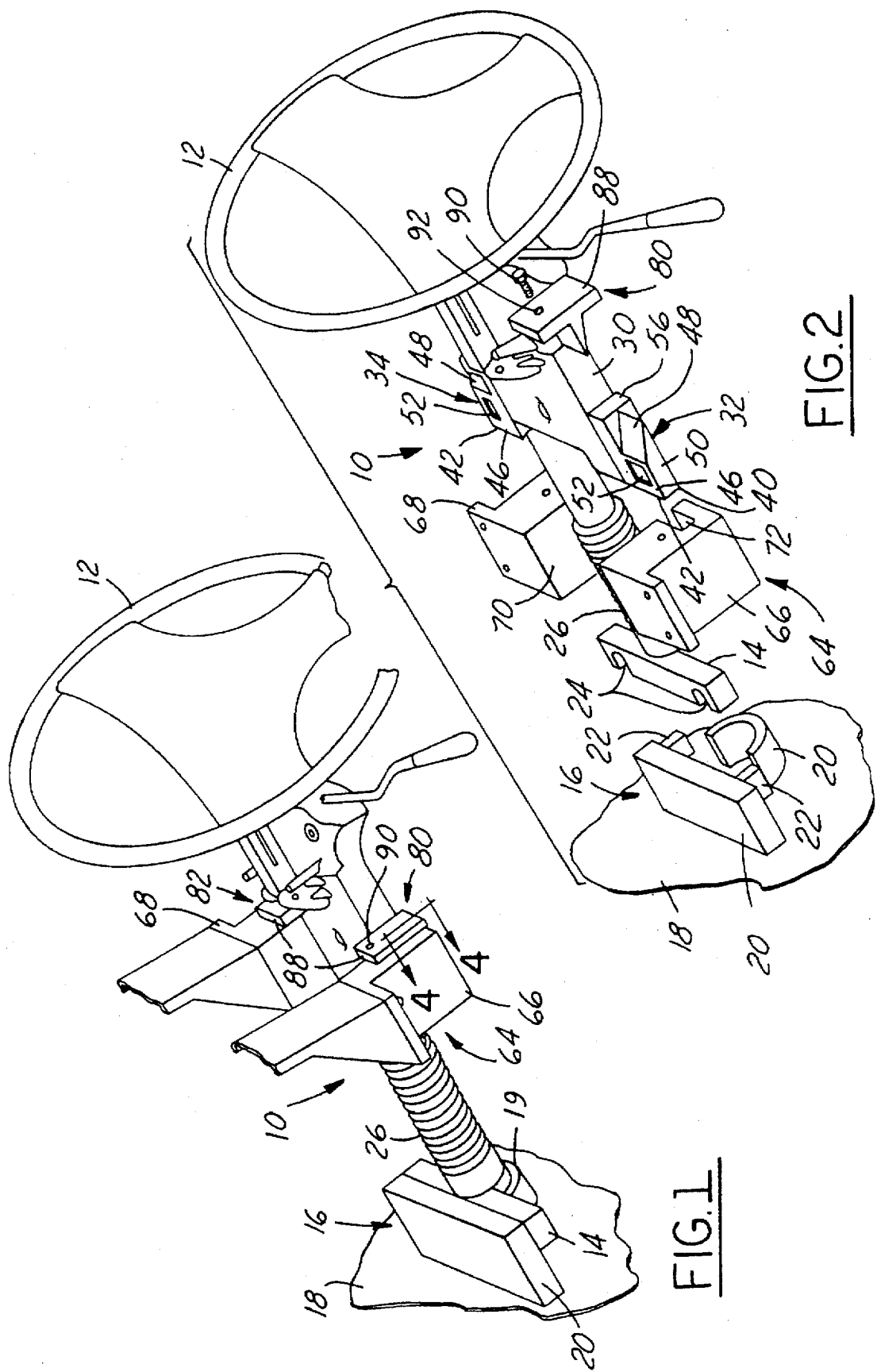

STEERING COLUMN QUICK-RELEASE MOUNTING

FIELD OF INVENTION

This invention relates generally to a support assembly for the steering column of an automotive vehicle and more particularly to a quick-release mounting which will not impede collapse of the steering column in a collision.

BACKGROUND OF THE INVENTION

A steering column tends to vibrate when the vehicle is in motion. To inhibit vibration, dampeners, in the form of capsules or disks, have sometimes been provided. The capsules usually were formed of a plastic material and often had a frictional hold on the mounting bracket of the steering column. In the past, the frictional hold of the capsules has impeded collapse of the steering column, particularly when the capsules were made of plastic which has a relatively high coefficient of friction. U.S. Pat. No. 5,390,955, assigned to the assignee of this invention and of which I am a co-inventor, discloses a capsule-type vibration dampener designed to eliminate frictional drag during collapse of the steering column.

SUMMARY OF THE INVENTION

In the steering column mounting of the present invention, a column upper mounting bracket has at least one and preferably two slide bars which slide in a groove or grooves of a mounting bracket on the instrument panel. Preferably, each slide bar and groove have confronting surfaces defining a recess which tapers in the direction of steering column collapse. A wedge is inserted into the recess to dampen vibration when the vehicle is in motion. The wedge preferably has a taper which matches the taper of the recess. The wedge dampens vibration of the steering column when the vehicle is in motion. However, when the steering column collapses as it sometimes does in a frontal impact, the wedge instantly releases and allows collapse of the steering column without interference.

The present invention permits quick release of the steering column without interfering with the collapse of the steering column. Capsules and fasteners to hold the capsules in place are not required. The clamping and frictional loading of fasteners on the capsules, sometimes interfering with steering column collapse, are eliminated. The release load will be controlled strictly by the energy absorption system, not the vibration dampening system.

The steering column preferably has a lower bracket which fits into a receiver on the vehicle frame. No lower bracket fasteners are required. During assembly, the slide bars on the upper mounting bracket will slide in the grooved portions of the support bracket on the instrument panel and at this point the column is loosely mounted in the vehicle without the need for the assembler to hold onto it. The wedges are then loaded into the grooves and secured in place. Only a single fastener is required for holding each wedge in place.

One object of this invention is to provide a quick-release mount for a steering column having the foregoing features and advantages.

Another object is to provide a quick-release mounting for a steering column which is constructed of a few simple parts, is rugged and durable in use, and is capable of being inexpensively manufactured and quickly and easily assembled.

These and other objects, features and advantages of the invention will become more apparent as the following description proceeds, especially when considered with the accompanying drawings.

BRIEF DESCRIPTION OF THE DRAWINGS

FIG. 1 is a perspective view of a steering column and steering column support for an automotive vehicle, constructed in accordance with the invention.

FIG. 2 is an exploded perspective view of the steering column and steering column support shown in FIG. 1.

DETAILED DESCRIPTION OF THE PREFERRING EMBODIMENTS

Figure 3:
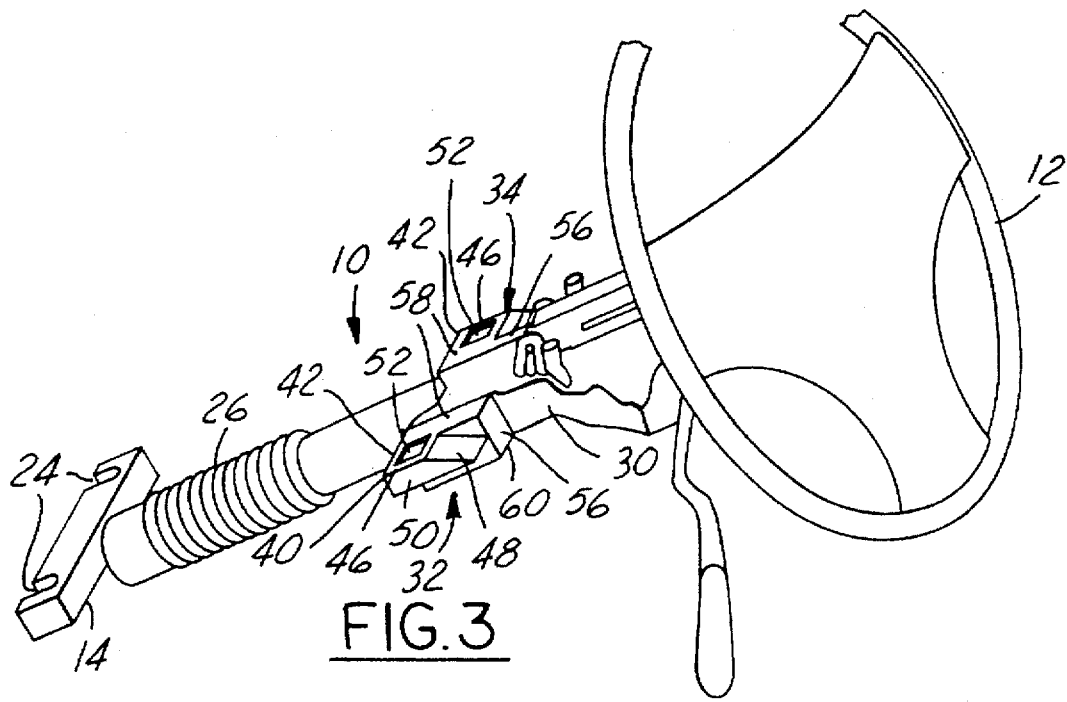
FIG. 3 is a perspective view of the steering column.

Referring now more particularly to the drawings, there is shown an elongated steering column 10 of an automotive vehicle. The steering column extends upwardly and rearwardly and has a steering wheel 12 at the upper end.

The steering column 10 has a lower mounting bracket 14 secured to the lower end. A lower support bracket 16 is rigidly secured to the firewall 18 which forms part of the frame structure of the vehicle. The lower support bracket 16 has a semi-cylindrical receiver 19 adapted to receive the lower end of the steering column. The lower support bracket also has a plate 20 with two laterally spaced ribs 22 on the underside. The lower mounting bracket 14 of the steering column has notches 24 to receive the ribs.

The steering column 10 has a collapsible, tubular, accordion-like tubular section 26 near the lower end which is capable of compressing or collapsing axially in response to a frontal impact when the driver is thrown against the steering wheel with sufficient force.

The steering column 10 has an upper mounting bracket 30 above the collapsible section 26. The mounting bracket 30 has a pair of laterally spaced-apart, parallel slide bars 32,34 formed integrally therewith. The slide bars 32,34 are mirror images of one another and are elongated in the direction of length of the steering column. Each slide bar has a tongue 40 which has a top surface 42 and a bottom surface 44. The top surface 42 has a front portion 46 which is parallel to the bottom surface 44, and has a rear surface, portion 48 which is sloped rearwardly from the front surface portion 46 towards the bottom surface 44 and intersects the bottom surface at the rear of the tongue 40. The tongue also has a laterally outer side 50 which is perpendicular to the front surface portion 46 of the top surface 42 and to the bottom surface 44 of the tongue.

A pad 52 of flexible, compressible material such as rubber or rubber-like natural or synthetic material is secured in a recess in the front surface portion 46 of each tongue for a purpose which will be clear from the following description.

Each slide bar 32,34 also has along the laterally inner side of the tongue an integral plate 56 which is of substantially the same length as the tongue 40, has a top surface 58 which is co-planar with and an extension of the front portion 46 of the top surface of the tongue and a bottom surface 60 which is parallel to its top surface but located somewhat below the bottom surface 44 of the tongue.

An upper support bracket structure 64 is provided. The upper support bracket structure 64 comprises a pair of laterally spaced upper support brackets 66 and 68 which are mirror images of one another and are rigidly secured to the frame structure of the vehicle. Each support bracket has on its laterally inner surface 70 an open-ended groove or slot 72 which extends parallel to the direction of length of the steering column. The height of each groove measured between its parallel top and bottom surfaces 74 and 76 corresponds to the height of the tongue 40 of each slide bar measured between the front portion 46 of the top surface and the bottom surface 44 thereof. The depth of each groove corresponds to the width of the tongue measured from its laterally outer side 50 to the plate 56.

When the steering column 10 is installed as shown in FIG. 1, the front, lower end thereof is supported in the receiver 19, with the notches 24 in the lower mounting bracket 14 receiving the ribs 22 on the plate 20 of the lower support bracket 16. The slide bars 32 and 34 are slidably received in the grooves 72 with the pads 52 compressed against the top surfaces 74 of the grooves. The rear portion of the top surface 74 of each groove confronts the sloped rear surface portion 48 of the tongue to form a tapered recess 78 which tapers in a direction toward the front end of the steering column, that is, in the direction of steering column collapse.

Figure 4:
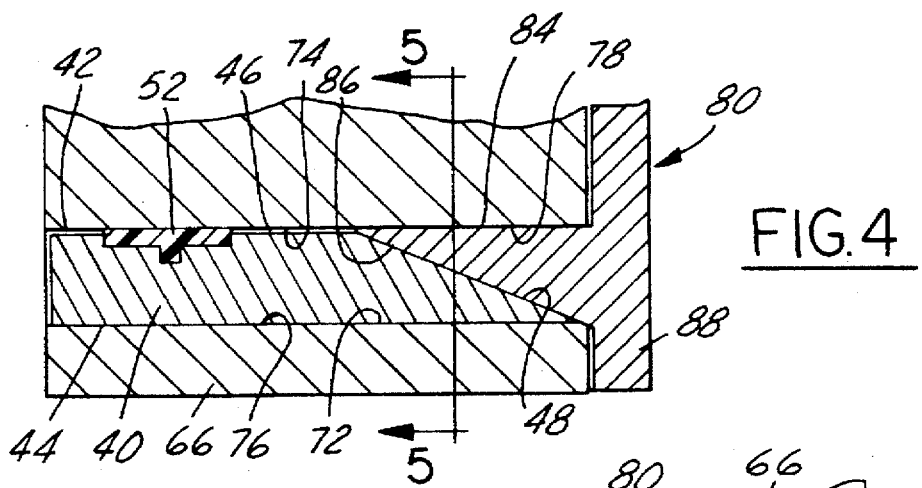
FIG. 4 is a fragmentary sectional view taken on the line 4—4 in FIG. 1.
Figure 5:
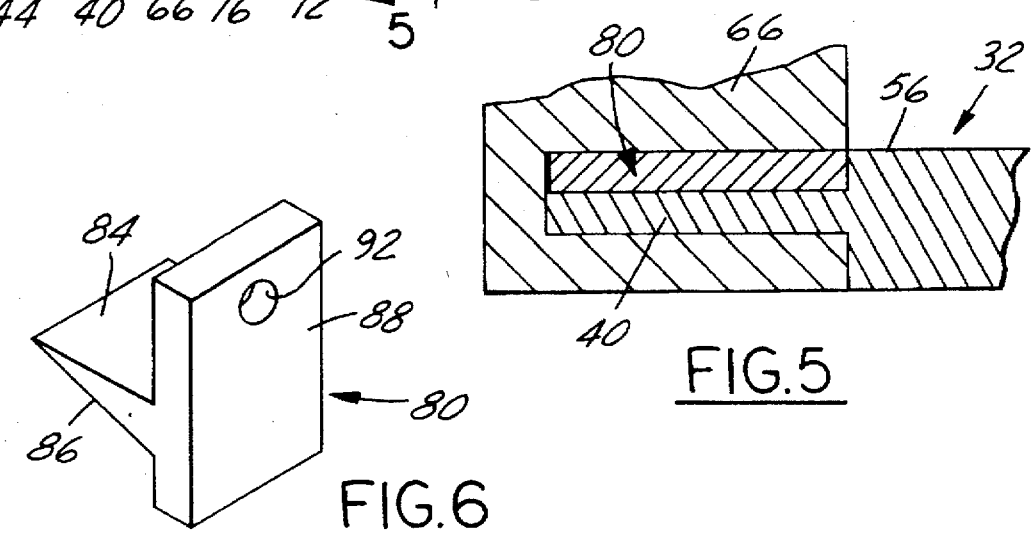
FIG. 5 is a sectional view taken on the line 5—5 in FIG. 4.

Wedges 80 and 82 are inserted in the tapered recesses. Each wedge has a top surface 84 which is parallel to the top surface 74 of the groove and a bottom surface 86 which is parallel to the sloping rear portion 48 of the top surface of the tongue 40. These top and bottom surfaces 84 and 86 of the wedges therefore taper with respect to one another in a forward direction at the same angle as the taper of the recesses. Because of the matching tapers, when a wedge is inserted in a recess 78 as shown in FIG. 4, its top and bottom surfaces have full surface contact with the top and bottom surfaces of the recess.

Figure 6:
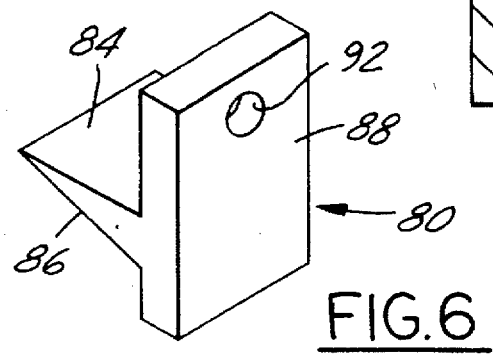
FIG. 6 is a perspective view of one of the wedges used in the quick-release mounting of this invention.

Each wedge has an integral clamping plate 88 (FIG. 6) which, when the wedge is installed as shown, overlies and engages the front surface of each support bracket 66,68 and is secured thereto by a threaded fastener 90 extending through a hole 92 in the plate.

Figure 7:
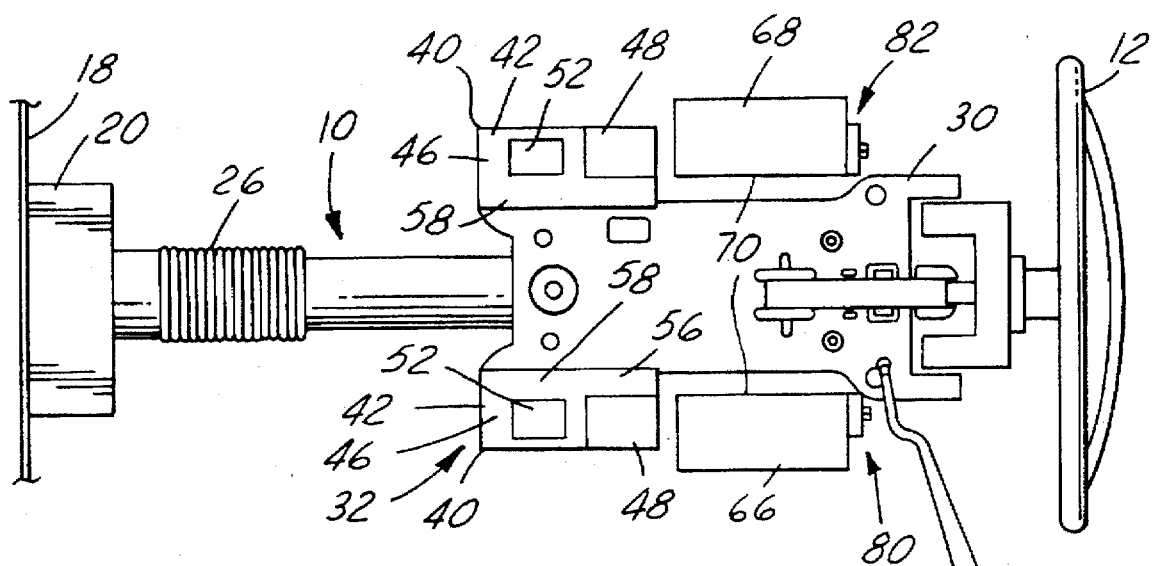
FIG. 7 is a top plan view of the steering column and steering column support shown after the steering column has collapsed.

The top and bottom surfaces 84 and 86 of each wedge engage the top and bottom surfaces of each recess 78 with light pressure sufficient to resist and dampen vibration, but with very little friction so that in the event of a frontal impact when the driver is thrown forwardly against the steering wheel and the steering column collapses, the slide bars 32,34 immediately disengage the wedges with virtually no resistance or interference. (See FIG. 7) The vibration dampening structure consisting of the slide bars 32,34, the support brackets 66,68 and wedges 80,82 have little, if any, interference with the collapse of the steering column.

Figure 8:
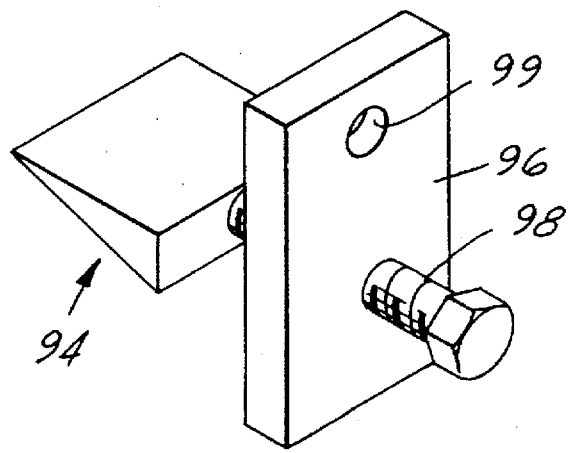
FIG. 8 is a perspective view of a wedge of modified construction.

FIG. 8 shows a wedge 94 of modified construction in which the clamping plate 96 is formed separate from the wedge and is attached thereto by a fastener 98 which threads through the clamping plate and has a swivel connection with the wedge. This modified construction allows for a fine-tuning of the engagement of the wedge with the surfaces of the recess by adjustment of the fastener 98. The clamping plate 96 has a hole 99 for receiving a threaded fastener which secures the plate 96 to the front surface of a support bracket 66,68 in the same manner as the fastener 90 secures the integral plate 88 thereto.

What is claimed is:

1. Apparatus for supporting an elongated steering column on the frame of an automotive vehicle and dampening vibration of the steering column when the vehicle is in motion and also permitting quick release and axial collapse of the steering column in a collision, comprising a steering column support bracket structure comprising a support bracket secured to the vehicle frame, a mounting bracket secured to the steering column, said support bracket having a groove extending lengthwise of the steering column, a slide bar on said mounting bracket slidable in said groove, said slide bar and groove having confronting surfaces defining a tapered recess which tapers in the direction of steering column collapse, and a wedge in engagement with the confronting surfaces of said recess to dampen vibration of the steering column when the vehicle is in motion but releasing its engagement when the steering column collapses.

2. Apparatus as defined in claim 1, wherein said wedge has wedge surfaces engaging said respective confronting surfaces of said recess, the wedge surfaces being tapered with respect to one another to match the taper of said recess.

3. Apparatus as defined in claim 2, and further including a flexible, compressible pad between said slide bar and groove to further dampen vibration.

4. Apparatus as defined in claim 2, wherein said steering column has a lower end and further including a lower mounting bracket on said lower end, and a lower support bracket mounted on the vehicle frame having a receiver for receiving said lower mounting bracket.

5. Apparatus as defined in claim 2, wherein said wedge has an integral clamping plate, and a fastener securing said clamping plate to said support bracket.

6. Apparatus as defined in claim 2, wherein said wedge has a clamping plate separate from said wedge, a fastener threaded through said clamping plate having an end on which said wedge is mounted, and a fastener securing said clamping plate to said support bracket.

7. Apparatus for supporting an elongated steering column on the frame of an automotive vehicle and dampening vibration of the steering column when the vehicle is in motion and also permitting quick release and axial collapse of the steering column in a collision, comprising a steering column support bracket structure comprising first and second, laterally spaced support brackets secured to the vehicle frame, a mounting bracket secured to the steering column, said first and second support brackets respectively having parallel first and second grooves extending lengthwise of the steering column, first and second, laterally spaced slide bars on said mounting bracket slidable in said respective first and second grooves, said first slide bar and said first groove having confronting surfaces defining a first tapered recess which tapers in the direction of steering column collapse, said second slide bar and said second groove having confronting surfaces defining a second tapered recess which tapers in the direction of steering column collapse, and first and second wedges in said respective first and second recesses in engagement with the confronting surfaces thereof to dampen vibration of the steering column when the vehicle is in motion but releasing their engagement when the steering column collapses, said first wedge having wedge surfaces engaging said respective confronting surfaces of said first recess and tapered with respect to one another to match the taper of said first recess, and said second wedge having wedge surfaces engaging the respective confronting surfaces of said second recess and tapered with respect to one another to match the taper of said second recess.

8. Apparatus as defined in claim 7, wherein said steering column has a lower end and further including a lower mounting bracket on said lower end, and a lower support bracket mounted on the vehicle frame having a receiver for receiving said lower mounting bracket.

9. Apparatus as defined in claim 8, and further including a flexible, compressible first pad between said first slide bar and said first groove to further dampen vibration, and a flexible, compressible second pad between said second slide bar and said second groove to further dampen vibration.

10. Apparatus as defined in claim 9, wherein said first and second wedges have first and second integral clamping plates respectively, and first and second fasteners securing said first and second clamping plates to said respective first and second support brackets.

11. Apparatus as defined in claim 9, wherein said first wedge has a first clamping plate separate therefrom, and said second wedge has a second clamping plate separate therefrom, first and second fasteners threaded through said respective first and second clamping plates having ends on which said first and second wedges are mounted, a third fastener securing said first clamping plate to said first support bracket and a fourth fastener securing said second clamping plate to said second support bracket.

* * * * *